US008686270B2

(12) United States Patent
Eggink et al.

(10) Patent No.: US 8,686,270 B2
(45) Date of Patent: Apr. 1, 2014

(54) APPARATUS AND METHOD FOR CLASSIFYING, DISPLAYING AND SELECTING MUSIC FILES

(75) Inventors: Jana Eggink, Hamburg (DE); Franck Giron, Waiblingen (DE); Thomas Kemp, Esslingen (DE)

(73) Assignee: SONY Corporation, Tokyo (JP)

( * ) Notice: Subject to any disclaimer, the term of this patent is extended or adjusted under 35 U.S.C. 154(b) by 378 days.

(21) Appl. No.: 13/079,362

(22) Filed: Apr. 4, 2011

(65) Prior Publication Data

US 2011/0252947 A1 Oct. 20, 2011

(30) Foreign Application Priority Data

Apr. 16, 2010 (EP) .................................... 10004073

(51) Int. Cl.
*G10H 7/00* (2006.01)

(52) U.S. Cl.
USPC .................................. 84/600; 84/601; 700/94

(58) Field of Classification Search
USPC ....................................... 84/600–602; 700/94
See application file for complete search history.

(56) References Cited

U.S. PATENT DOCUMENTS

| 8,204,837 | B2 * | 6/2012 | Saito et al. ....................... 706/12 |
| 2007/0006717 | A1 | 1/2007 | Myeong et al. |
| 2007/0174274 | A1 | 7/2007 | Kim et al. |
| 2007/0204227 | A1 * | 8/2007 | Kretz ............................ 715/727 |
| 2008/0294277 | A1 * | 11/2008 | Hicken et al. ................... 700/94 |
| 2010/0328312 | A1 * | 12/2010 | Donaldson .................... 345/440 |
| 2011/0087665 | A1 * | 4/2011 | Weare ........................... 707/737 |
| 2011/0252947 | A1 * | 10/2011 | Eggink et al. .................... 84/609 |
| 2012/0023403 | A1 * | 1/2012 | Herberger et al. ............. 715/716 |
| 2012/0096026 | A1 * | 4/2012 | Saito et al. ..................... 707/769 |
| 2012/0101966 | A1 * | 4/2012 | van Coppenolle et al. ...... 706/20 |
| 2012/0254806 | A1 * | 10/2012 | Gossweiler et al. ........... 715/835 |
| 2012/0278831 | A1 * | 11/2012 | van Coppenolle et al. ..... 725/25 |
| 2012/0290621 | A1 * | 11/2012 | Heitz et al. ..................... 707/780 |
| 2013/0024547 | A1 * | 1/2013 | Saito et al. ..................... 709/219 |
| 2013/0080565 | A1 * | 3/2013 | van Coppenolle et al. ... 709/213 |
| 2013/0086698 | A1 * | 4/2013 | van Coppenolle et al. ..... 726/29 |

FOREIGN PATENT DOCUMENTS

JP 2007172523 A * 7/2007

OTHER PUBLICATIONS

Fabio Vignoli et al., "A Music Retrieval System Based on User-Driven Similarity and It's Evaluation," Philips Research Laboratories, 2005, pp. 272-279.

* cited by examiner

*Primary Examiner* — David S. Warren
(74) *Attorney, Agent, or Firm* — Oblon, Spivak, McClelland, Maier & Neustadt, L.L.P.

(57) ABSTRACT

At an apparatus (200), which may be a consumer electronic device, the user may select a predetermined number of different music attributes (Attr) descriptive of a mood delivered by music represented by music content of a music file. From parameters of a music file available in the apparatus (200), the apparatus (200) determines a first vector ($m_1$(Dat)) descriptive of a relationship between the music content and all selected music attributes (Attr) and a second vector ($m_2$(Dat)) and outputs a classification information related to the music file and containing the first and second vectors ($m_1$(Dat), $m_2$(Dat)). The classification information may be used to assign a colour to a displayed object assigned to the music file. Perceptually similar music files may be displayed in similar colours.

15 Claims, 7 Drawing Sheets

APPARATUS AND METHOD FOR CLASSIFYING, DISPLAYING AND SELECTING MUSIC FILES

Embodiments of the invention relate to a method for classifying music files for identifying similar pieces of music and to methods for displaying and selecting classified music files. Other embodiments refer to consumer electronic devices capable of classifying music files and to consumer electronic devices for displaying or selecting classified music files.

Consumer electronic devices with high storage capacity typically include means that assist the user in managing the music files, for example by automatically generating playlists. The playlists may be generated in accordance with a presetting related to genre, mood, interpreter or others.

The object underlying the invention is to provide a method that assists the user in classifying music files, wherein the results of the classification are in closer accordance with the user's notion of similarity in perception. Another object is a graphical interface for displaying classified music files and allowing a music file selection mechanism whose results meet user's expectations to a higher degree. A further object is to provide consumer electronic devices allowing enhanced music file classification, display and selection. These objects are achieved with the subject matters of the independent claims. Further embodiments are specified in the corresponding dependent claims.

Details of the invention will become more apparent from the following description of embodiments in connection with the accompanying drawings. The features of the various embodiments may be combined unless they exclude each other.

Figure 1:
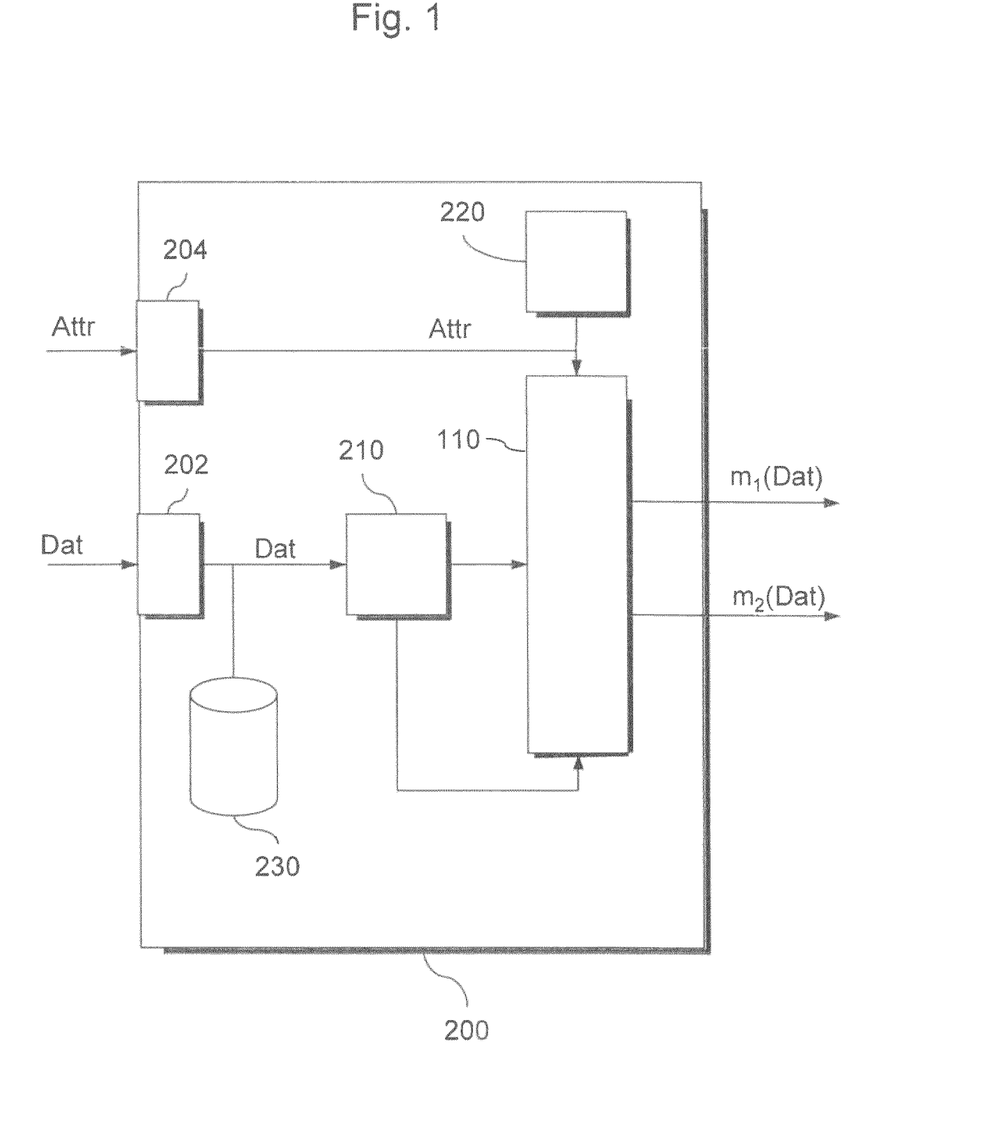
FIG. 1 is a simplified block diagram illustrating a consumer electronic device in accordance with an embodiment referring to a calculator unit for calculating a mood related vector.

FIG. 1 refers to an apparatus 200 which is an electronic device such as a consumer electronic device. The apparatus 200 may be a handheld device with a music playback function, for example a portable music player, a cellular phone, a digital personal assistant, or a stationary device, for example a home entertainment computer or an audio tuner with music record function. The consumer electronic device may have an input port 202 for receiving a music file Dat or a storage unit 230 for locally storing music files or both.

The consumer electronic device may include an extraction unit 210 for determining parameters descriptive of the music contained in a music file Dat provided by the storage unit 230 or via the input port 202. The parameters may concern perception-related features like tempo, rhythm, dynamic range, instrumentation, beats per minute, time domain aspects, frequency domain aspects, and cepstral aspects, and not perception-related features like interpreter, year of release and language. In accordance with other embodiments, the consumer electronic device may receive the parameters assigned to a music file from another device. For example, the consumer electronic device may receive the parameters together with the respective music file from another consumer electronic device or a server.

The consumer electronic device may also have a further input port 204 for receiving information on selected music attributes ("channels", "mood models") Attr descriptive of a perceptual notion delivered by music represented by the music content of a music file. Alternatively or additionally the consumer electronic device may include a user entry unit 220, with which a user may select at least two different music attributes.

A music attribute Attr may be represented by or may be derived from one single music parameter or music feature, for example tempo, dynamic range, mean loudness, or may combine two or more parameters in a way that they provide perceptual-oriented information about the music content of the respective music file, for example information related to genres, to which the music can be assigned, or information related to moods descriptive of the perceptual notion of the music. The music attributes Attr may be derived from the complete music file contents or from a relevant part thereof.

For example, some combinations of parameters or parameter ranges may be typical for a perception of a music content as more or less "extreme", other combinations and parameter ranges may be typical for a perception as "relaxed", "energetic", or "upbeat", or for a perception as belonging to a cross-genre class like "ballad", electronic", "acoustic", "lounge", "classical" or "music". Other music attributes may correspond to genres like "pop", "rock", "classic" or "jazz". According to an embodiment, the user entry unit 220 allows the selection of two or three different music attributes.

On the basis of all or a subset of the parameters of a target music file Dat, a calculator unit 110 calculates a first vector $m_1(Dat)$ that is descriptive of a degree of agreement between the music content of the target music file Dat and the selected music attributes Attr. The calculator unit 110 outputs a classification information containing at least the first vector $m_1(Dat)$. The classification information contains also additional information $m_2(Dat)$ descriptive of a degree of agreement between the music contents of the target music file Dat and another proper or improper subset of the music attributes. For example, the second vector $m_2(Dat)$ represents the best fitting music attribute and defines the affinity to a domain in a plane in which the music attributes are grouped.

According to other embodiments, the additional information $m_2(Dat)$ is a second, different mood-related vector determined by the calculator unit 110 and descriptive of the music represented by the music content of the same music file Dat. The second vector $m_2(Dat)$ may define a position in a mood plane based on two different parameters or music attributes, for example one single parameter and one music attribute based on the evaluation of at least two parameters. The two-dimensional mood plane may define a Cartesian or rotational coordinate system, by way of example. According to an illustrative embodiment, the user may select a mood/tempo-space, wherein the position of a music file is defined by a first parameter describing a value on a sad-to-happy axis and a second, different parameter describing a value on a beat-per-minute axis.

The classification information may be displayed or may be transmitted to a further consumer electronic device. According to other embodiments, the classification information may be assigned to the music file Dat and stored as an attached attribute together with the respective music file Dat within the consumer electronic device, for example in the storage unit 230. The classification information may be used for automatically generating playlists, or for finding music files perceptually similar with an identified piece of music, for example the music file most recently selected or played-back at the consumer electronic device or for selecting perceptually similar music files.

Figure 2:
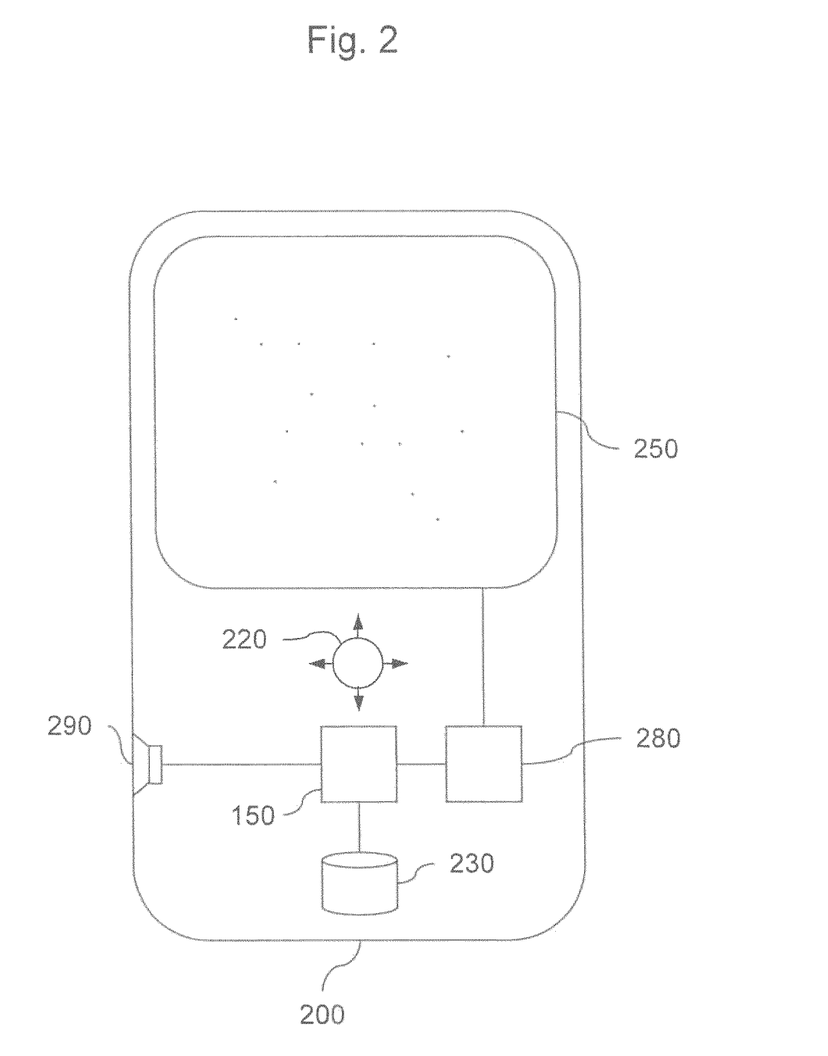
FIG. 2 is a simplified block diagram showing a consumer electronic device in accordance with another embodiment referring to handheld consumer electronic devices for display and selection of music files.

FIG. 2 refers to an apparatus 200 where the classification information is used for assisting the user in selecting music files out from a plurality of music files available in a database. According to the illustrated embodiment, the apparatus 200 is a handheld consumer electronic device with a display 250 and a user entry unit 220.

In response to a user command input at the user entry unit 220, a control unit 150 of the consumer electronic device controls the transfer of music files stored in a storage unit 230 to an output unit 290. The control unit 150 may be or may include a processor. The user entry unit 220 may include a manual input device with buttons and/or sensors or may be integrated in or combined with the display 250, wherein the display 250 and the user entry unit 220 form a touchscreen capable of detecting and sensing the presence and location of a touch within a display area of the display 250. According to other embodiments, for example stationary consumer electronic devices, the user entry unit 220 may include a receiver unit for receiving electric signals from other electronic devices, for example an IR (infrared) receiver or an USB (universal serial bus) port. The output unit 290 may be or include a loudspeaker, a headphone jack, an audio output port or a data output port configured to transmit music files. The control unit 150 may transmit information to be displayed on the display 250 to a display control unit 280 that may be a graphical processor for controlling the display 250 to display the information provided by the control unit 150.

In accordance with an embodiment, the consumer electronic device may allow the user to select two or three channels for defining a first vector. When the user wishes to define his personal mood-space, he may operate the user entry unit 220 to request the control unit 150 to display a suitable selection menu on the display 250. For example, the control unit 150 may cause the display control unit 280 to display a list of music attributes on the display 250.

Figure 3A:
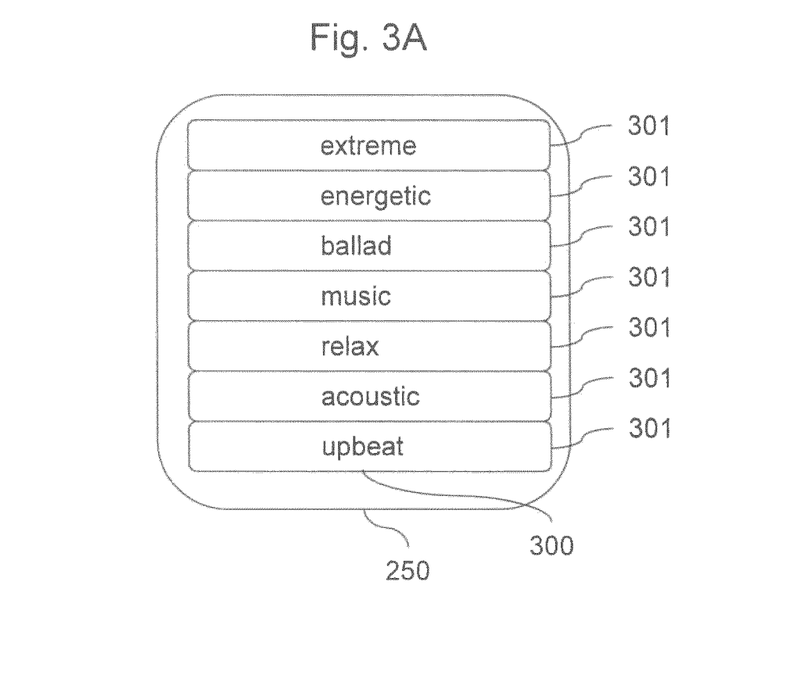
FIG. 3A is a schematic illustration of a display displaying a list for defining a first mood related vector in accordance with an embodiment referring to a method for classifying music files.

FIG. 3A shows a list 300 displayed on a display 250 and containing several entries 301, wherein each entry 301 represents one of a plurality of predefined music attributes. In accordance with an embodiment, the list 300 contains music attributes referring to genres and music attributes referring to perceptually different cross-genre music classes like "extreme", "energetic", "music", "upbeat", "podcast", "ballad" "electronic", "acoustic", "relax", "lounge, "classical", or others. Each music attribute may be a combination of parameter values of certain music features. The assignment of measurable parameter values to music attribute values may be based on the evaluation of the ratings of test music files by test persons and combining the evaluation results with the measurable parameters of the test music files.

Referring again to FIG. 2, the user may manipulate the user entry unit 220 to select a predetermined number of music attributes from the list 300. For example, the predetermined number of selectable music attributes is two or three. According to an embodiment, the user may select all two or three music attributes. In accordance with another embodiment, the user selects only one or two music attributes and the control unit 150 automatically chooses one or two further suitable music attributes. In accordance with further embodiments, the user selects one or two music attributes and the control unit 150 automatically chooses a suitable second or a suitable third music attribute such that for the user selected music attributes a neutral class can be identified, with reference to which at least two of the selected music attributes can be considered antithetic.

In addition, the user may assign a graphic attribute to each selected music attribute. The graphic attribute may be the colour or the contour of an object assigned to the music file. According to another example, the control unit 150 automatically assigns the graphic attribute, for example a fundamental colour, to each selected music attribute. For each music file contained in a database stored in the storage unit 230, the control unit 150 may output a classification information containing a first vector that is derived from the values of the selected music attributes. According to an embodiment, the control unit 150 may also determine additional information, for example a best fitting music attribute or a second, different vector descriptive of the perceptual notion of the music file by the user. The control unit 150 may enclose the additional information, for example the best fitting music attribute or the second vector, in the output classification information.

Figure 3B:
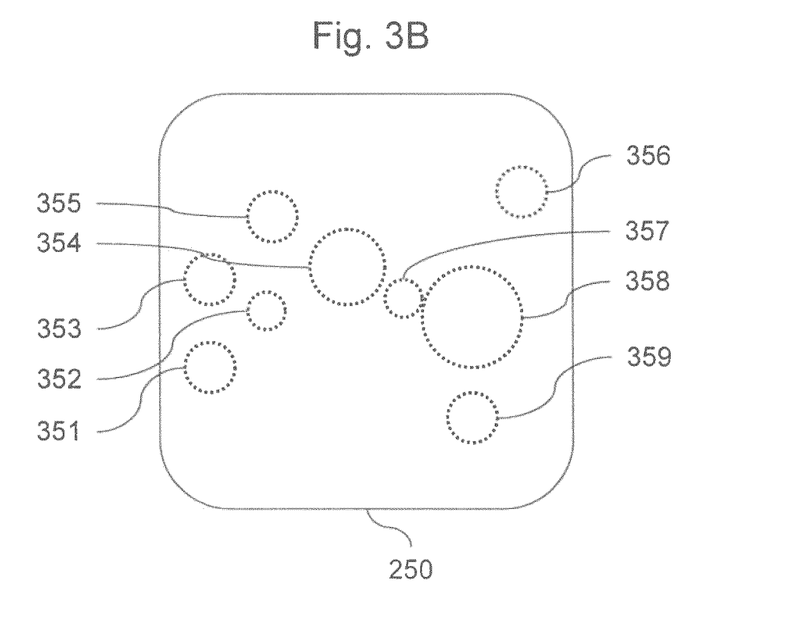
FIG. 3B is a schematic illustration of display domains assigned to music attributes in accordance with embodiments referring to methods for displaying and selecting music files.

Referring to FIG. 3B, the best fitting music attribute may be used to determine the position of an object in a mood plane, where the music attributes are assigned to different domains grouped in accordance with the perceptual proximity of the respective music attributes. For example, on a display 250 a first domain 351 may be assigned to the music attribute "classical", a second domain 352 to the attribute "lounge", a third domain 353 to the attribute "relax", a fourth domain 354 to the attribute "ballad", a fifth domain 355 to the attribute "acoustic", a sixth domain 356 to the attribute "extreme" a seventh domain 357 to the attribute "electronic", an eighth domain 358 to the attribute "energetic", and a ninth domain 359 to the attribute "upbeat". Objects assigned to music files having "relax" as the best fitting music attribute are displayed in or next to the third domain 353, objects assigned to music files with "classical" as best fitting music attribute are displayed in or near to the first domain 351.

In accordance with another embodiment the consumer electronic device may assist the user in defining the second vector. For example, the user may operate the user entry unit 220 to request the control unit 150 to display a suitable selection menu for music features and attributes. The selection menu may be a second list containing several entries, wherein each entry may represent a parameter like beats per minute or dynamic range, or a music attribute, for example a sad-happy index, a perceptually different cross-genre music class like "extreme", "energetic", "music", "upbeat", "podcast", "ballad" "electronic", "acoustic", "relax", "lounge, "classical", or others. The selected entries for the second vector may define a mood plane on the display. The mood plane may be a Cartesian plane, where the axes denote parameters or metadata dimensions such as happy/sad or slow/fast, wherein a sad/happy parameter may be mapped onto the x-axis and a slow/fast parameter may be mapped on the y-axis.

Referring again to FIG. 2, in a display and/or selection mode of the consumer electronic device, the classification information $m_1(Dat)$, $m_2(Dat)$ may be used to control the visual representation of objects assigned to the music files on the display unit 150. By way of example, the objects may be crosses, circles, points, squares or characters. For each displayed object the first vector $m_1(Dat)$ may determine an appearance of at least a section of the object and the additional information or the second vector may determine the position of the object on the display unit 250.

In accordance with an embodiment, the control unit 150 may map the second vector $m_2(Dat)$ into a plane, orthogonal Cartesian system with each of the two vector dimensions assigned to one of two orthogonal display axes. For example, the beats-per-minute axis of the mood-space may be mapped onto a y-axis of the display and the sad-to-happy axis may be mapped onto an x-axis, such that slow titles suggestive of sadness appear in the lower left quarter and fast titles suggestive of happiness appear in the upper right quarter.

According to an embodiment, the first vector $m_1(Dat)$ may determine the contour of the respective object. In accordance with another embodiment, the object contains colour information about at least the best fitting music attribute of the selected music attributes. For example, the object may have the colour of that music attribute that fits best with the first vector of the respective music files when a discrepancy between the first vector $m_1(Dat)$ and the music attribute does not exceed a predetermined threshold value. An object may contain colour information about two close music attributes when a discrepancy between the first vector $m_1(Dat)$ and the best fitting music attribute exceeds the predetermined threshold. In accordance with an embodiment, the object may include two or more sub-areas, each sub-area having a colour assigned to one of the music attributes, wherein an area ratio of the sub-areas may correspond to an agreement ratio of the first vector $m_1(Dat)$ with the respective music attribute.

In accordance with another embodiment, the colour of the object or at least a sub-area of the object is a combination colour that is mixed from the two fundamental colours assigned to the two closest music attributes when a discrepancy between the first vector and the closest music attribute exceeds the predetermined threshold.

Figure 3C:
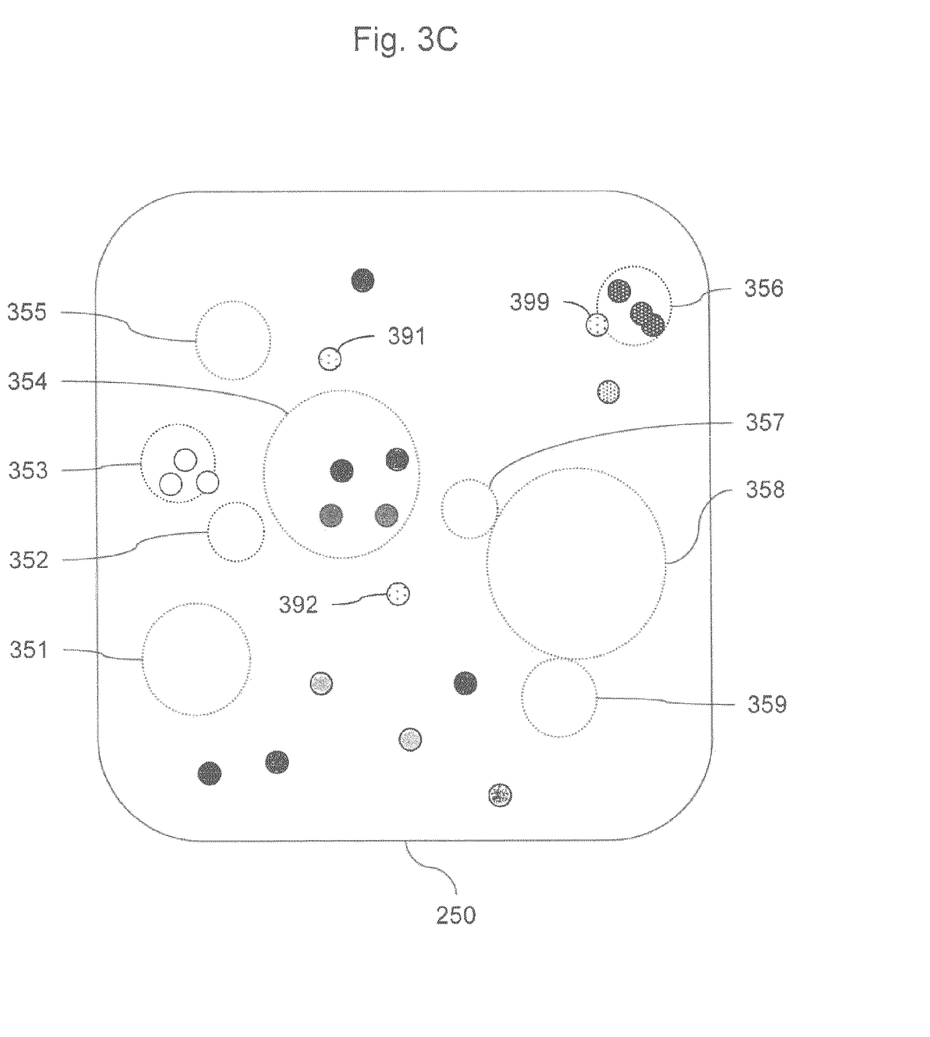
FIG. 3C is a schematic illustration of a display displaying objects assigned to music files in accordance with the embodiment of FIG. 3B.

FIG. 3C refers to an embodiment where the position of the objects result from the segmentation of a display 250 in domains 351-359 as described with reference to FIG. 3B and the best fitting music attribute for the displayed music files. In the illustrative example, the selected music attributes are "extreme" assigned to the fundamental colour red, "ballad" assigned to the fundamental colour green, and "relax" assigned to the fundamental colour blue. In substance, the frequency of red objects is high near the sixth domain 356 assigned to the attribute "extreme", the frequency of green objects is high near the fourth domain 354 assigned to the attribute "ballad", and the frequency of blue objects is high near the third domain 353 assigned to the attribute "relax".

However, the method allows identification of music files that, though placed close to a first domain, show stronger perceptual proximity to other music files placed close to other domains. For example, the object 399 identifies a music file that though its proximity to the sixth domain 356 representing extreme music contents, the user perceives as similar to the music files represented by objects 391, 392 which are positioned close to other domains but which have a similar colour. Similar colours representing similar first vectors identify perceptually similar music content in a cross-genre manner.

Referring again to FIG. 2, the consumer electronic device may analyze each music file stored in the storage unit 230 to generate a score table for each music file. The control unit 150 may analyze a music file in response to a user command or automatically, for example when the music file is stored in the storage unit 230 for the first time. In accordance with other embodiments, the consumer electronic device may receive the score table together with the music file or the score table may already be embedded in the music file.

The score table is determined on the basis of objective, measurable parameters descriptive of the music content of the concerned music file. It assigns a score value to each music attribute selected for the first vector, wherein the score value is a measure for the degree of agreement of the music contained in the music file with a subjective perception quality represented by the music attribute. Table 1 shows an example for a score table assigned to a music file X:

TABLE 1

| Channel | Score |
|---|---|
| Extreme | 5.65 |
| Energetic | 6.48 |
| Music | 7.03 |
| Upbeat | 7.44 |
| Podcast | 9.44 |
| Ballad | 10.27 |
| Electronic | 10.33 |
| Acoustic | 10.96 |
| Relax | 12.44 |
| Lounge | 12.51 |
| Classical | 12.79 |

For three selected music attributes relative scores may be evaluated with reference to a neutral class using equation (1):

$$x_i = \frac{\text{score}\{X, \text{channel}(i)\} - \text{score}\{X, \text{channel}("\text{neutral class}")\}}{\text{score}\{X, \text{channel}("\text{neutral class}")\}} \quad (1)$$

According to the illustrated embodiment the music attribute "music" is selected as neutral class. With channel(0)=extreme, channel(1)=ballad, channel(2)=relax and the absolute scores $\{X, \text{channel}(i)\}$ of table 1, equation (2) gives the relative score vector $x_i$:

$$x_i = [x_0(\text{extreme}); x_1(\text{ballad}); x_2(\text{relax})] = [0.196; -0.460; -0.768] \quad (2)$$

With reference to the neutral class "music", the best fitting channel for the music file X is "extreme". The channels "ballad" and "relax" follow in decreasing order.

According to an embodiment, the relative score values may be used for determining graphic properties of a displayed object assigned to the music file X. In accordance with another embodiment, the relative scores may be normalized with respect to the music files available in the database of interest, for example the whole or a selected part of that database, to which the music file X belongs. For example, the relative scores may be normalized with respect to the widest range of all reference relative channel scores available in the database using equation (3):

$$y_i = \frac{x_i - \min(x)}{\max\{i\} - \min\{i\}} \quad (3)$$

wherein $y_i$ is the normalized relative score. For the illustrative example, the database of interest may deliver the following values for max $\{i\}$ and min $\{i\}$:

TABLE 2

| | |
|---|---|
| max(extreme) | 0.412 |
| min(extreme) | −7.013 |
| max(ballad) | 0.228 |
| min(ballad) | 0.611 |
| max(relax) | 1.394 |
| min(relax) | −0.852 |

With min(x) equal to −0.768, the resulting normalized vector becomes:

$$y_i = [y_0(\text{extreme}); y_1(\text{ballad}); y_2(\text{relax})] = [0.129; -0.365; 0] \quad (4)$$

The first two values may then be used as vector norms in a two-dimensional colour plane. The preceding normalization step allows utilizing the complete range of values for these channels which also results in a larger variation of the norms.

Figure 4:
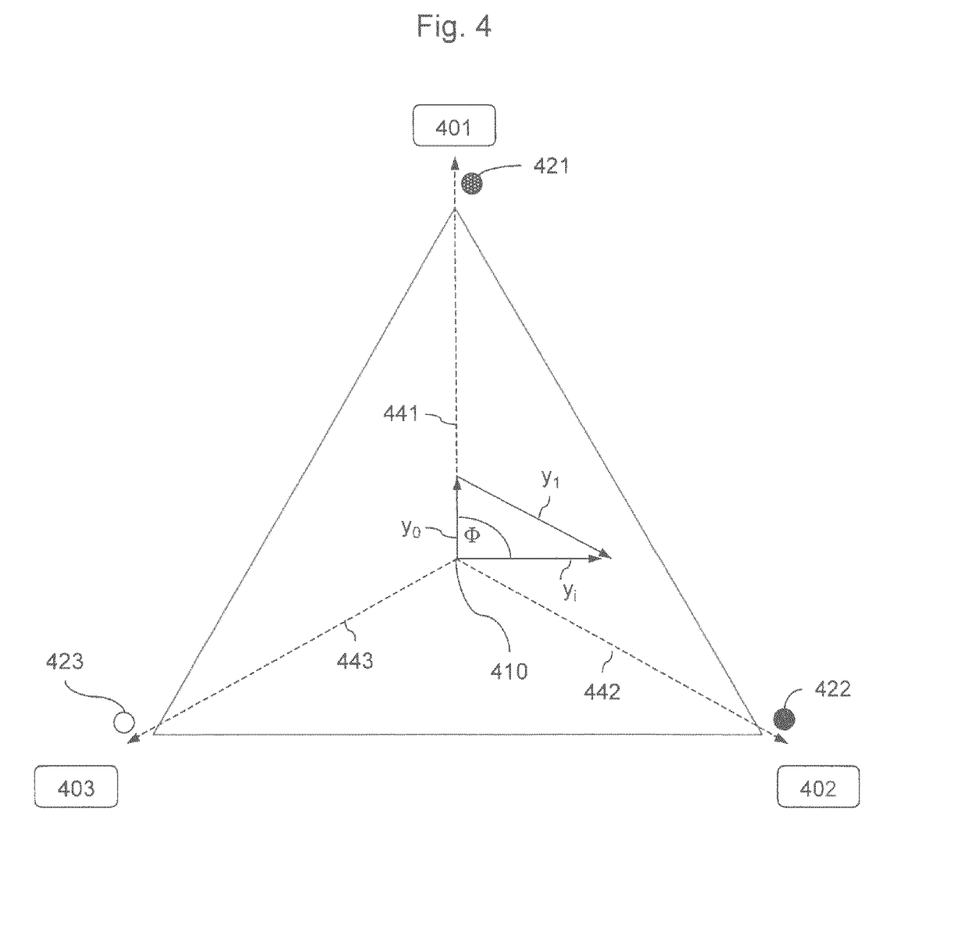
FIG. 4 is a simplified diagram of a colour plane for illustrating details of colour allocation to mood related vectors in accordance with the embodiment of FIG. 3C.

FIG. 4 illustrates details of colour assignment in accordance with an embodiment referring to the selected music attributes "extreme", "relax", and "ballad". In a colour plane, three music attributes are assigned to three different colours and three different directions related to a point of origin 410. According to an embodiment, a first music attribute 401 is assigned to a first colour 421 and a first direction 441, a second music attribute 402 is assigned to a second colour 422 and a second direction 442 different from the first direction 441, and a third music attribute 403 is assigned to a third colour 423 and a third direction 443 different from the first and the second direction. The second direction 442 may be rotated by 120 degrees versus the first direction 441 and the third direction 443 may be rotated by −120 degrees versus the first direction 441. The first, second and third colours may be the fundamental colours of the RGB (red, green, blue) colour system. According to an embodiment, the three directions 441, 442, 443 span a hue system, wherein the direction of the first vector referred to the hue system defines the hue of an object assigned to the first vector.

According to the illustrative example, the music attribute "extreme" is assigned to a hue of 0 degree (red), the music attribute "ballad" is assigned to a hue of 120 degrees (green) and the music attribute "relax" is assigned to a hue of 240 degrees (blue). The vector $y_i$ with the basic vector $y_0$ plotted along the 0 degree direction and with the basic vector $y_1$ plotted along the 120 degree direction gives a hue $\Phi$ of about 90 degrees. As a result, in a system, where the music attributes "extreme", "relax" and "ballad" are assigned to the hues for red, green and blue respectively, the music file X is assigned to a combination of green and yellow.

Objects of music files that the user perceives as similar to the music file X are assigned to similar hues. Perceptual divergences are transformed into colour variations. When objects assigned to music files are displayed in colours corresponding to the evaluated hues, the user can easily determine the perceptual distance on the basis of the degree of colour deviation.

The saturation and lightness of an object may be set equal for all objects. In accordance with other embodiments, saturation and lightness can be used to indicate further music attributes or parameters. For example, the saturation may depend on the sad/happy parameter and/or the tempo. According to an embodiment, the luminance is made directly proportional to a relative speed score of the models, wherein the relative score is derived from the absolute speed value related to the maximum speed range available in the database.

Figure 5:
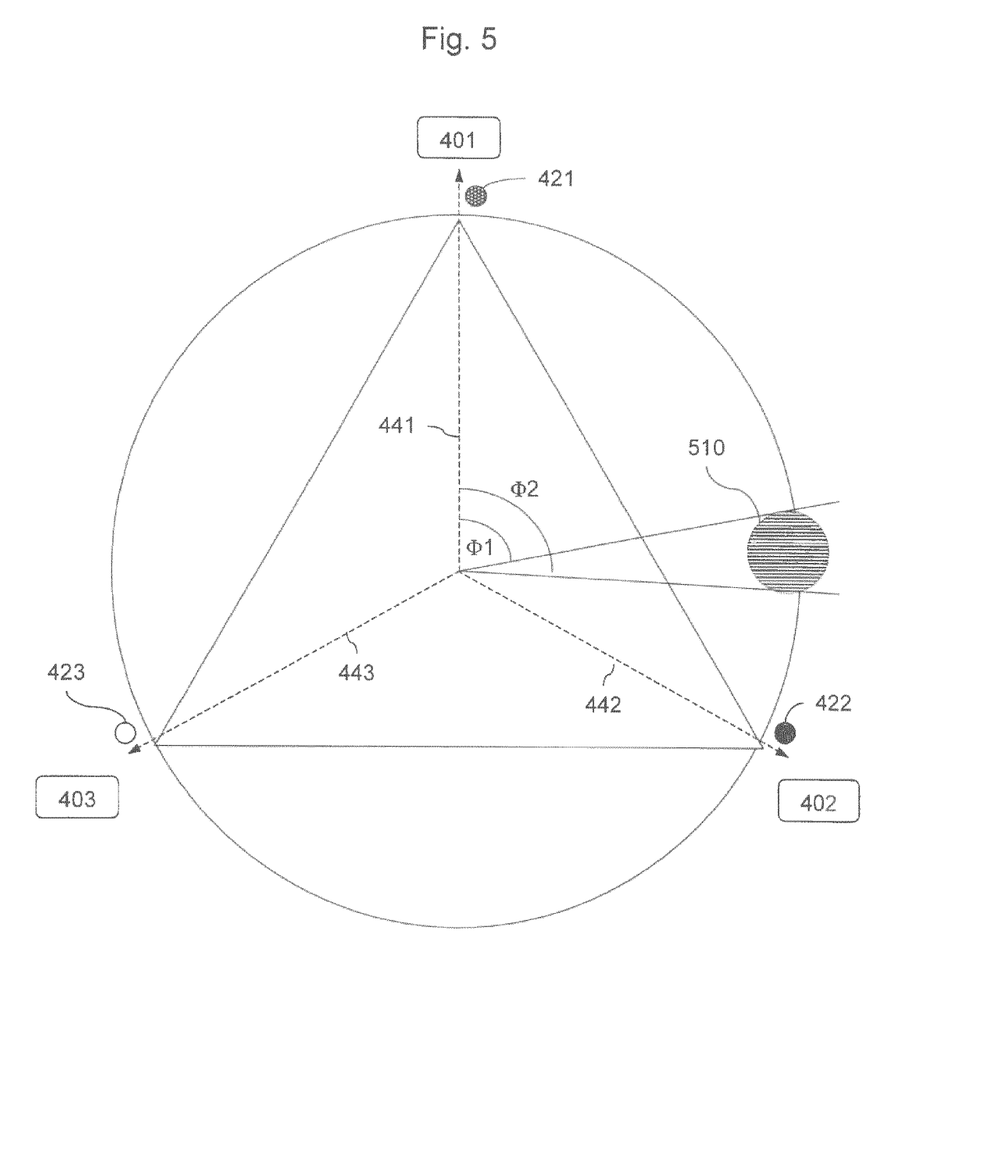
FIG. 5 is a simplified diagram of a colour plane for illustrating details of a selection mechanism in accordance with another embodiment referring to a method of selecting music files on the basis of the embodiment of FIG. 3B.

FIG. 5 refers to a method of selecting data files. A colour selection object may be displayed on the display of a consumer device. The colour selection object has sections of different colour. According to an embodiment, the colour selection object includes the fundamental colours and secondary colours. For example the colour selection object is a complete hue colour wheel, a complete RGB field or a section of a hue colour wheel or an RGB field. The user may select a colour or colour field 510 to define an input hue or an input hue range $\Phi_1$ to $\Phi_2$.

The consumer electronic device then may select such music files which first vectors result in hue values with the lowest degree of discrepancy to the input hue. For example, if the consumer electronic device is preset to generate playlists with a predetermined number of entries, for example ten, the consumer electronic device selects the ten music files with the closest hue values for the playlist. According to other embodiments, the consumer electronic device may generate a playlist of all music files which hues fall within the input hue range $\Phi_1$ to $\Phi_2$.

Figure 6:
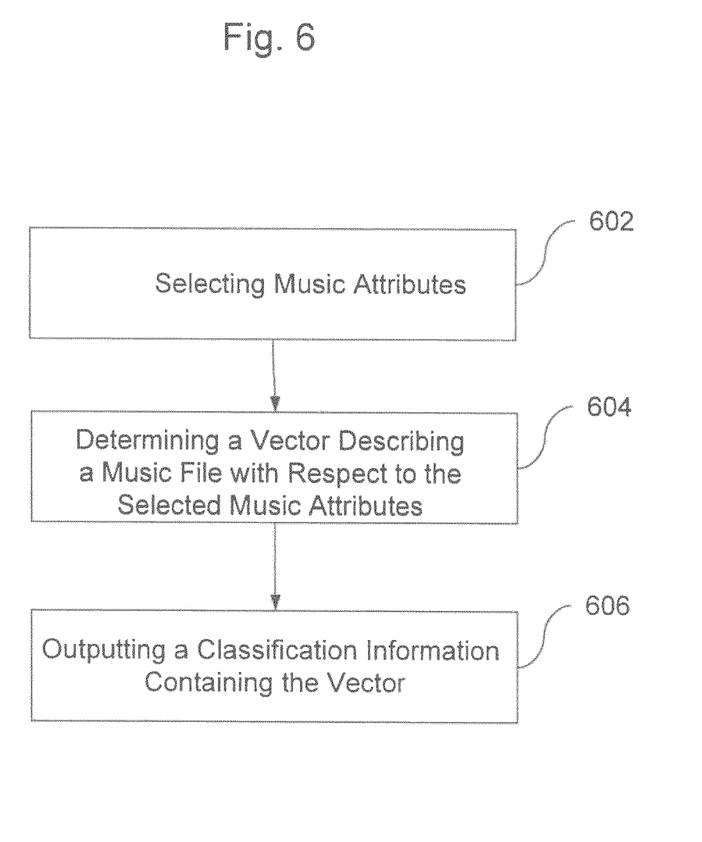
FIG. 6 is a simplified flow chart for illustrating a method of classifying music files in accordance with a further embodiment.

According to the method illustrated in the flow chart of FIG. 6, a user may select, at an apparatus, for example at a consumer electronic device, a predetermined number of different music attributes, for example three music attributes, that are descriptive of a mood delivered by music represented by music content of a music file (602). From parameters of a music file available in the apparatus, the apparatus determines a first vector descriptive of a relationship between the target music file and the selected music attributes and a second vector descriptive of a relationship between the target music file and a proper or improper subset of the music attributes (604) and outputs a classification information related to the music file and containing at least the first and second vectors (606).

The invention claimed is:

1. A method of operating an apparatus evaluating music files, the method comprising:
   selecting, at the apparatus, a predetermined number of different music attributes of a plurality of music attributes each descriptive of a mood of music;
   determining, from parameters of a target music file available in the apparatus, a first vector descriptive of a relationship between the target music file and the selected music attributes and a second vector descriptive of a relationship between the target music file and a subset of the plurality of music attributes; and
   outputting the first and second vectors.

2. The method of claim 1, further comprising
   displaying an object on a display in dependence on the first and second vectors.

3. The method of claim 2, wherein
   the first vector determines a graphic attribute and the second vector determines a position of the displayed object.

4. The method of claim 1, wherein
   vectors similar to the first vector identify perceptually similar music content in at least two different genres.

5. The method of claim 1, wherein
   the predetermined number of different music attributes is three.

6. The method of claim 5, wherein
   each of the selected music attributes is assigned to fundamental colour and the first vector determines a colour of a displayed object.

7. The method of claim 6, wherein
   the displayed object includes colour information related to two of the selected music attributes.

8. The method of claim 6, wherein the displayed object includes an area having a colour that is a combination colour mixed from two fundamental colours assigned to two closest of the selected music attributes.

9. The method of claim 1, further comprising sensing a user selection of one or a subset of displayed objects.

10. An electronic device including circuitry configured as:
- a user entry unit configured to be operated by a user, wherein the user can select a predetermined number of different music attributes of a plurality of music attributes each descriptive of a mood of music;
- a calculator unit configured to determine, from parameters of a target music file available in the electronic device, a first vector descriptive of a relationship between the target music file and the selected music attributes and a second vector descriptive of a relationship between the target music file and a subset of the plurality of music attributes, the calculator unit further being configured to output the first and second vectors.

11. The electronic device of claim 10, further comprising a display for displaying objects assigned to a plurality of music files, wherein the circuitry is further configured as a display control unit configured to control the display to display an object in dependence on the first and second vectors, wherein for each of the displayed objects,
- the second vector determines a position of the object, and
- the first vector determines a colour of at least a sub-area of the object.

12. The electronic device of claim 11, wherein the object includes colour information related to at least two of the selected music attributes.

13. The electronic device of claim 11, wherein the sub-area has a combination colour mixed from two colours assigned to two closest of the selected music attributes.

14. The electronic device of claim 10, wherein the user entry unit is further configured to sense a user selection of one or more of displayed objects, the colour or a colour range.

15. The electronic device of claim 10, wherein the predetermined number of different music attributes is three.

* * * * *